(12) United States Patent
Van Eeden et al.

(10) Patent No.: US 12,520,812 B2
(45) Date of Patent: Jan. 13, 2026

(54) MILKING DEVICE INCLUDING TUBE-SHAPED FILTER COMPONENT

(71) Applicant: LELY PATENT N.V., Maassluis (NL)

(72) Inventors: Bart Van Eeden, Rotterdam (NL); Malouk Maria Franck, Leiden (NL); Gerard Mostert, Schipluiden (NL)

(73) Assignee: LELY PATENT N.V., Maassluis (NL)

( * ) Notice: Subject to any disclaimer, the term of this patent is extended or adjusted under 35 U.S.C. 154(b) by 56 days.

(21) Appl. No.: 18/580,702

(22) PCT Filed: Jul. 20, 2022

(86) PCT No.: PCT/IB2022/056683
§ 371 (c)(1),
(2) Date: Jan. 19, 2024

(87) PCT Pub. No.: WO2023/007314
PCT Pub. Date: Feb. 2, 2023

(65) Prior Publication Data
US 2024/0324542 A1 Oct. 3, 2024

(30) Foreign Application Priority Data
Jul. 28, 2021 (NL) .................................... 2028863

(51) Int. Cl.
*A01J 5/007* (2006.01)
*A01J 7/02* (2006.01)
*A01J 11/06* (2006.01)
(52) U.S. Cl.
CPC ............... *A01J 5/007* (2013.01); *A01J 7/022* (2013.01); *A01J 11/06* (2013.01)

(58) Field of Classification Search
CPC ............ A01J 5/007; A01J 7/022; A01J 11/06
(Continued)

(56) References Cited

U.S. PATENT DOCUMENTS

| 2,075,175 | A | * | 3/1937 | Byrd | ...................... B01D 33/42 |
| | | | | | 210/217 |
| 4,500,435 | A | | 2/1985 | Müller | |

(Continued)

FOREIGN PATENT DOCUMENTS

| EP | 1 820 393 A2 | 8/2007 |
| RU | 2 229 794 C2 | 6/2004 |
| RU | 2 229 796 C2 | 6/2004 |

OTHER PUBLICATIONS

International Search Report issued Nov. 24, 2022 in PCT/IB2022/056683 filed on Jul. 20, 2022, 5 pages.

*Primary Examiner* — Brady W Frazier
(74) *Attorney, Agent, or Firm* — Oblon, McClelland, Maier & Neustadt, L.L.P.

(57) ABSTRACT

A milking device is provided with milking means, a control unit, a milk line for transporting the milk from the milking means to a milk tank, a milk filter for filtering the milk passing through the milk line, and a cleaning device for the milk filter with cleaning liquid. The milk filter includes a housing which surrounds a filter volume and has a milk inlet and a milk outlet, and a filter component in the filter volume. The filter component includes a circumferential plate part with filter openings, and divides the filter volume into a central inner filter volume and an outer filter volume surrounding the latter. The filter component includes wire with a unilaterally tapering cross-sectional profile and a frame. The wire is provided in a spiral shape with a plurality of windings or in a series of individual parallel rings or rods.

18 Claims, 3 Drawing Sheets

Figure 1:
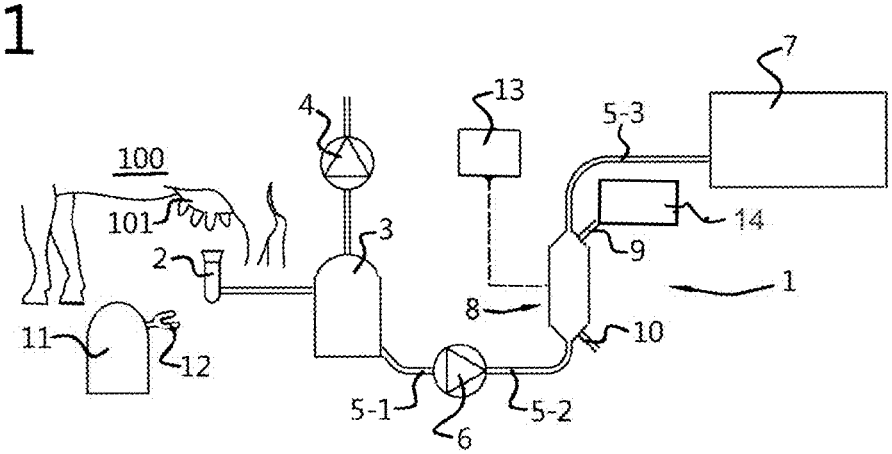

(58) Field of Classification Search
USPC .................................................. 119/14.08
See application file for complete search history.

(56) References Cited

U.S. PATENT DOCUMENTS

| 10,173,154 | B2* | 1/2019 | Freidinger | ............ | B01D 29/114 |
| 12,168,190 | B2* | 12/2024 | Stuiver | ................. | B01D 29/15 |
| 2011/0073550 | A1 | 3/2011 | Cartarius | | |
| 2020/0384388 | A1 | 12/2020 | Stuiver | | |

* cited by examiner

MILKING DEVICE INCLUDING TUBE-SHAPED FILTER COMPONENT

CROSS REFERENCE TO RELATED APPLICATIONS

This application is a National Stage entry under 35 U.S.C. § 371 of PCT/IB2022/056683, filed on Jul. 20, 2022, and claims priority to NL 2028863, filed on Jul. 28, 2021, the entire contents of which are incorporated herein by reference.

The invention relates to a milking device for milking a dairy animal, and provided with milking means, a control unit for the milking device, a milk line for transporting the milk from the milking means to a milk tank, a milk filter for filtering the milk passing through the milk line, and a cleaning device for cleaning the milk filter with a cleaning liquid, wherein the milk filter comprises a housing which surrounds a filter volume and which comprises a milk inlet part with a milk inlet, a milk outlet part with a milk outlet and a circumferential outer wall in between, wherein the milk filter is configured to be flushed, in use, in a first direction with the milk to be filtered, which first direction runs from the milk inlet to the milk outlet, wherein the cleaning device is configured to clean the milk filter by passing cleaning liquid through the milk filter in a countercurrent direction opposite to the first direction.

Milking dairy animals requires the milked milk to be filtered. In this case, dirt, such as manure and bedding particles, hairs, but also small cell clusters and flakes and the like, are filtered from the milk before it is passed to the milk tank. Over the course of time, the filter will become very soiled. Until now, filter sleeves have been used, which were replaced at least three times a day.

NL C 1037403 discloses a milking device with a stainless steel milk filter which can be cleaned by means of countercurrent cleaning. As a result thereof, the filter can continue to be used without having to be replaced. In this way, the labor-intensive replacement of the filter sleeves and the excessive use of base materials can already be prevented in an efficient manner. No further details regarding any aspect of the milk filter are given in this case.

However, it has been found in practice that such milking devices are not cleaned satisfactorily, which may lead to a reduction in the quality of the milk and also to the milk filter becoming blocked more quickly, which may result in the milking device coming to a standstill. This is an undesirable situation which may largely cancel the advantages.

It is therefore an object of the present invention to improve, in particular, the cleanability of the known milking device.

To this end, the invention provides a milking device according to claim 1, in particular a milking device for milking a dairy animal, and provided with milking means, a control unit for the milking device, a milk line for transporting the milk from the milking means to a milk tank, a milk filter for filtering the milk passing through the milk line, and a cleaning device for cleaning the milk filter with cleaning liquid, wherein the milk filter comprises a housing which surrounds a filter volume, and which comprises a milk inlet part with a milk inlet, a milk outlet part with a milk outlet, and a circumferential outer wall in between, and a tube-shaped filter component with a longitudinal dimension which is provided in the filter volume filter opening, and which divides the filter volume into a central inner filter volume which is connected to one of the milk inlet and the milk outlet, and an outer filter volume surrounding the latter, and connected to the other one of the milk inlet and the milk outlet, which filter component comprises wire with a unilaterally tapering cross-sectional profile and a frame, which wire is provided in a spiral shape with a plurality of windings or in a series of individual parallel rings or rods, wherein the frame is configured to keep the windings and/or the rings and/or the rods at a mutual distance, as a result of which the plurality of filter openings is provided between the windings and/or the rings and/or the rods, wherein the milk filter is configured to be flushed, in use, in a first direction with the milk to be filtered, which first direction runs from the milk inlet to the milk outlet, wherein the cleaning device is configured to clean the milk filter by passing cleaning liquid through the milk filter in a countercurrent direction opposite to the first direction in at least two consecutive pulses, in such a way that in every pulse, during a first pulse stage, more cleaning liquid is supplied than is discharged, and subsequently, during a second pulse stage, at least as much cleaning liquid flows from the filter volume as is supplied, so that an amount of cleaning liquid collects in the filter volume up to a liquid level which surrounds at least a portion of the plurality of openings.

Without considering itself to be bound to a specific explanation or interpretation, the Applicant presumes that the cleanability of, in particular, the filter is improved by the invention due to the fact that the amount of liquid collected in the filter volume, due to its non-compressibility, forms a kind of wall which the cleaning liquid of the next pulse hits. This collision creates additional turbulence resulting in a greater turbulence intensity in the liquid, both in the top layer of the formed layer of liquid and in the new cleaning liquid which collides with it. These turbulences result in improved cleaning action, in particular at the location of these turbulences. It has been found in practice that a lot of soiling of the milk filter occurs in and on openings which are situated higher up, probably because these soiling particles and substances float on the surface of the milk in the milk filter. The known cleaning method which uses only countercurrent in particular cleans these openings which are situated higher up insufficiently. By providing the liquid level and the greater turbulence associated with the subsequent pulse, in particular the cleaning of these openings situated higher up is greatly improved. The main point is thus a combination of a liquid level and liquid which flows against the latter.

In this case, it should be noted that the first pulse stage of the subsequent pulse succeeds the second pulse stage of the last pulse. In the second pulse stage, the cleaning liquid has the time and opportunity to sink in the filter volume on account of the force of gravity, and consequently form a liquid level. The new cleaning liquid of the first pulse stage of the next pulse then collides with this liquid level. In this case, the second pulse stage has to be sufficiently long in order to allow this liquid level to form. This time duration depends, inter alia, on the geometry of the filter volume, but in most cases, one or a few tenths of a second suffice. Waiting much longer does not make much sense, because the cleaning action of stationary liquid is relatively small. Partly because of this, the time duration of the second pulse stage should not be excessively long either. All this will be explained in more detail below.

It should furthermore be noted that when the milking device is in use, the plurality of filter openings does not extend in a perpendicular plane to the force of gravity. This is due to the fact that otherwise all filter openings will either be situated under the liquid level or be situated above, which is disadvantageous for the cleaning action, inter alia because the liquid is then unable to arrange itself efficiently with respect to the filter openings of the filter component. In practice, the plurality of filter openings will often extend in a vertical plane, at least a surface which comprises a vertical.

Particular embodiments of the invention are described in the subclaims and are explained in more detail below.

Advantageously, the liquid level is situated in an upper half of the plurality of filter openings, in particular during at least part of the second pulse stage. As has already been mentioned above, it was found in practice that in particular the upper filter openings were most soiled and (partly as a result thereof) most difficult to clean. By choosing and setting the liquid level in such a way that it lies in the upper half of the filter openings, the filter openings at the location of that liquid level and above will be cleaned more thoroughly. Furthermore, it is possible to determine, on the basis of tests, which filter openings are difficult to clean and to choose a suitable liquid level on the basis of the test results.

In particular embodiments, the cleaning device is configured to change the liquid level from pulse to pulse, in particular to raise it from pulse to pulse. This increases the proportion of filter openings which are cleaned very thoroughly, as the greater turbulence at the location of these filter openings causes greater fluctuations in speed and thus in the local wall sheer stress. In this way, it is in principle possible to clean the entire filter component more thoroughly. The liquid level does not have to be changed between every two pulses. Thus, it is for example also possible to maintain the same liquid level for two or more pulses before changing the liquid level. It is also possible to change the liquid level in different small steps and even to alternately increase and decrease it. Thus, it is for example possible to clean the portion of the filter openings/the filter component which is most difficult to clean with most pulses.

In embodiments, the pulses have a frequency of more than 0.5 Hz. Advantageously, the second pulse stage is shorter than 1 second, more advantageously at most 0.5 seconds. In this case, the usual rounding rules apply. The inventor has found that a pulsed stream is more efficient than a constant stream of cleaning liquid, and that the pulses themselves create additional turbulence near the wall, so that providing a large number of pules in a short period of time may be advantageous.

The number of pulses during a cleaning operation is not particularly limited. In particular, the number of pulses is between 2 and 20, more particularly between 10 and 20. This is a good compromise between the duration of the cleaning operation and water usage, on the one hand, and the cleaning result, on the other hand.

In embodiments, the milking device comprises a pressure device which is configured to provide pressurized cleaning liquid to the milk filter. The pressure device is not particularly limited, but advantageously comprises an accumulator for cleaning liquid. By providing the cleaning liquid under pressure, it is possible to create even stronger turbulence in the liquid, which results in an even better cleaning result.

It is noted here that it is possible to supply the cleaning liquid via the milk outlet and discharge it via the milk inlet, and in this case allow it to follow the same path the milk takes. In some cases, it may be advantageous if the cleaning liquid is (virtually) only destined for the milk filter and to provide a separate supply connection near or at the milk outlet to this end, as well as a discharge connection to a collecting receptacle or sewer at or near the milk inlet. Thus, the cleaning liquid can be brought into action and has a negligible effect on the rest of the milking device, for example with regard to the temperature of lines during cleaning. This also makes an optimum control over the cleaning liquid possible, because the path to be travelled is very small. In this case, the cleaning liquid can be recycled, collected for subsequent re-use or discharged to a sewer or the like. It is furthermore possible to provide a valve device, in particular a three-way valve, at the supply connection and/or the discharge connection which can control the cleaning liquid stream, more particularly separated from a previous or later milk flow.

In embodiments, the milking device comprises a compressed air supply for supplying compressed air to the cleaning liquid before the latter enters the filter volume. Supplying compressed air to the stream of cleaning liquid further increases the intensity of the turbulence, so that cleaning is improved even more. The compressed air supply may be provided on or near the supply connection of the cleaning liquid, but is not limited thereto.

It is noted here that, in particular when using compressed air, it is useful not to make the duration of the second pulse stage excessively long and advantageously to limit it to less than ¾ second, more advantageously to at most ½ second, but the time duration depends slightly on the geometry of the milk filter. The inventor presumes that a longer time duration, such as ¾ second, results in the introduced compressed air forming large bubbles in the cleaning liquid collected in the filter volume. As a result thereof, the air/liquid mixture in its entirety becomes compressible and consequently acts less as a fixed liquid level or "wall" with which the new pulse cleaning liquid can collide and cause additional turbulences. With shorter times, such as at most ½ second, the formation of bubbles is greatly reduced to small bubbles which have been found to have a much reduced effect on the compressibility, and thus the turbulence structures produced. It is furthermore noted here that "cleaning liquid" is also understood to mean liquid mixed with compressed air.

In embodiments, the milking device comprises an inlet valve device which is controllable by the control unit for controlling a supply of cleaning liquid, and/or an outlet valve device which is controllable by the control unit for controlling a discharge of the cleaning liquid. The inlet valve device is then for example provided in, on or near the milk discharge and the outlet valve device in, on or near the milk supply, although it is also possible to provide the respective valve device in a line portion which is intended solely for cleaning liquid, such as for example in or near a cleaning liquid reservoir. The inlet valve device may be configured to control the supply of the cleaning liquid in pulses and comprises, for example, an electromagnetically or otherwise actuable valve which is operated by the control unit. It may already suffice to fully open the valve for a desired time and subsequently close it again. The valve may also have a controllable passage, which passage is adjustable by means of the control unit. For example, the control unit may open the inlet valve device to such a degree during the first pulse stage that the supply of cleaning liquid to the filter volume is greater than the discharge of cleaning liquid from the filter volume, and may close it to a sufficient degree during the second pulse stage that the supply is smaller than the discharge. All this obviously depends on, inter alia, the geometry of the discharge, but can, in practice, easily be controlled and adjusted, for example using a proportional valve. Alternatively or additionally, the discharge can be controlled accordingly by means of the optional outlet valve device, by now throttling the discharge in the first pulse stage to such a degree that it is smaller than the supply (which therefore can now not be zero) and that it is at least equal to the supply (which in this case can be zero) during the second pulse stage. Obviously, a combination of the two valve devices may provide even more control over supply and discharge of the cleaning liquid.

It is important to note that having a discharge of cleaning liquid from the filter volume which is not excessively large may be sufficient to ensure that it is possible to achieve that the net supply is greater than zero during the first pulse stage and only using the inlet valve device, and is smaller or equal to zero during the second pulse stage, while still leaving a sufficiently usable liquid level. As long as the liquid level in the filter volume is maintained for a usable time, for example in the order magnitude of 0.1 to at most ¾ second or less, such as at most 0.5 second, the effect of increased turbulence near the wall at a level above the bottom end of the filter component is maintained. It is advantageous if the pulses do not last excessively long. Thus, short pulses which succeed one another relatively quickly produce respective peaks in the local wall sheer stress, which is advantageous in order to loosen dirt. In practice, it will be relatively easy to bring about a small discharge from the filter volume to this end.

It should furthermore be noted here that the expression "the liquid level" does not necessarily refer to a time-independent level. Not only the liquid level may be varied from pulse to pulse, as has already been mentioned above, but the liquid level may be varied during a pulse as well, provided there is a more or less identifiable liquid level of cleaning liquid during the second pulse stage. In this context, the initial level could also be referred to as "the liquid level".

Varying the liquid level from pulse to pulse may be achieved by changing the balance between supply and discharge of cleaning liquid. As has been described above, use may in this case be made of the inlet valve device and/or the outlet valve device by changing the time during which they are open. It is also possible to change only the time duration during which they are closed, so that the pulses succeed one another more quickly, for example, while the passage remains the same. This may also result in an increase in the amount of cleaning liquid in the filter volume and thus in a variation of the liquid level. Combinations, optionally with yet other alternatives, are not excluded.

In embodiments, the inner filter volume is connected to the milk outlet. This means that the milk flows into the outer filter volume which is situated concentrically outwards, then passes through the filter component, and finally flows out of the milk filter via the inner filter volume and the milk outlet. As a result, foreign material which has been filtered out will remain on the outer side of the filter component. When the milk filter is subsequently cleaned in countercurrent, the cleaning liquid will flow from the inside to the outside. Consequently, the foreign material will then be discharged more efficiently than in the reverse direction, although that direction is not excluded.

In particular, said outer wall of the housing of the milk filter is transparent. In this way, it is possible to look at the filter component from the outside, both in order to see if it has become (too) soiled, and to visually assess whether the filter component has been cleaned sufficiently well. Obviously, the outer wall may also be non-transparent, for example made completely of metal or a plastic.

In attractive embodiments, the housing is substantially cylindrical and said filter component is concentric with the outer wall. The shape of the housing and the filter component is not particularly limited per se, but advantageously these are concentric, so that a good control of the flow of the cleaning liquid through the housing and past and through the filter component can be ensured. In addition, a cylindrical shape of the filter component contributes to the cleanability of the unit, because corners with a much slower flow and fewer fluctuations in velocity which are difficult to clean are thus prevented.

According to the invention, the filter component comprises wire, which is provided in a spiral shape with a plurality of windings or in a series of individual parallel rings or rods. Furthermore, the filter component also comprises a frame, wherein the frame is configured to keep the windings or the rings or the rods at a mutual distance, as a result of which a plurality of filter openings are provided between the windings or the rings or the rods. The frame keeps the windings, rings or rods at the mutual distance, for example by means of small clamps or other spacing elements, if desired supported by the force of gravity. Preferably, the windings, the rings or the rods are securely connected to the frame, for example by means of a welded or other connection. The frame may comprise, for example, a series of mutually parallel supporting wires. In the case of the windings or the rings, these may be provided, for example, parallel to the longitudinal direction of the filter component, advantageously distributed around a circumference thereof. In the case of the parallel rods, the frame may comprise a series of mutually parallel supporting rings which keep the rods, which preferably extend parallel to the longitudinal direction of the filter component, together like the staves of a barrel. Advantageously, the provided supporting wires or supporting rings of the frame, at the location of their connection with the windings or rings, respectively the rods, extend perpendicular thereto.

It should be noted that the filter openings then effectively extend between, on the one hand, adjacent windings, rings or rods and, on the other hand, adjacent supporting wires or supporting rings. The filter openings are therefore rectangular, often relatively elongate, to square in extreme cases, and at least form part of a cylinder surface in each case.

An advantage of such a filter form is that it can be produced in an efficient way, with readily controllable tolerances. It is true that precisely due to the often elongate filter openings, there is a risk of dirt particles which are likewise elongate and have a longest dimension which is much larger than a smallest dimension of the filter openings, nevertheless passing through the filter component. For example, a hair of a dairy animal, with a dimension of approximately 0.1 mm and a length of, for example, a few centimetres, can still pass relatively easily through a filter opening whose smallest dimension is only marginally greater than 0.1 mm, but which is fairly elongate, in particular if the frame is attached on the side of the greatest distance between the windings, rings or rods. After all, the length of the filter openings on the supply side is then very large. It is advantageous if the smallest dimension of the filter openings which, in virtually all practical cases, corresponds to the distance between the windings, the rings or the rods, is significantly smaller than the smallest elongate dirt particles to be expected. In the case of a milk filter, these are the hairs, so that said smallest dimension is preferably at most for example 80 µm. Theoretically, it is possible to use a frame with a large number of supporting wires or supporting rings in order to thus create square holes, or even filter openings whose smallest dimension extends between said supporting wires or rings. However, this requires so much work in order to bring about the connections between frame and wire, and sacrifices a relatively large part of the cross-sectional flow-through area of the filter component, that this will remain theoretical. It should be noted that, in the case of a panel with holes, this problem will occur far less often or even not at all, because these holes will in practice often be round.

According to the invention, the wire has a unilaterally tapering cross-sectional profile. This means that the filter openings become increasingly smaller in the one direction due to the filter component, and become increasingly larger in the opposite direction. This is advantageous to combine a good filter action with a good cleanability through counter-flow cleaning. It should be noted that the filter openings will often be elongate (see the explanation below) and will have a smallest dimension which is then measured between the adjacent windings, rings or rods. In the case of a tapering cross-sectional profile of the wire, this dimension is the one of concern and it becomes even greater in the direction of the tapering part of the wire, so that the through-flow opening becomes larger. It may be useful to turn the smallest dimension of the filter openings facing the soiled side, that is to say facing the inflow side of the milk, and thus to turn their greatest dimension facing the outflow side of the milk. As a result thereof, foreign material in the milk to be filtered will be retained by the filter component, but will not become stuck in narrowing filter openings. If cleaning liquid is then passed through the filter component in countercurrent, this will be better able to remove any foreign material which is still present due to the fact that the filter openings narrow in the countercurrent direction, since the flow velocity and optionally the turbulence intensity will increase with narrowing filter openings. In practice, the dimensions of the filter openings will largely be determined by the properties of the milk. An example of a useful smallest dimension is approximately 60 μm, while the dimension towards the other side reaches up to for example 120 μm and more. Obviously, other dimensions are also possible.

It is emphasized again that the "smallest dimension" does not refer to the length of the filter openings, which in practice will be much greater than the distance between the coils, rings or rods. If a dirt particle is so small that it can enter a filter opening, it will not get stuck afterwards, because the size of the filter opening only increases after that. Therefore, the filter element will in principle only get dirty on the surface facing the inflowing milk, so that a counter-current cleaning will ensure that this dirt on the surface of the filter element will rinse loose and be removed.

The cross-sectional profile of the wire is preferably triangular. This provides the filter component with sufficient strength and ensures that the flow properties can be calculated reliably. Nevertheless, other profile shapes, such as semi-circular, semi-elliptic or the like are also possible. In advantageous cases, the tapering of the cross-sectional profile runs from a flat end, in actual fact a side of the wire, towards a narrower, pointed or rounded end, in actual fact an opposite side of the wire.

The frame may be attached to the narrower side of the wire and/or to the flat side of the wire. There are a few advantages if the frame is attached to (only) the narrower side of the wire. Thus, the throughflow of the filter component will be affected to a lesser degree by the frame, because the dimension of the filter opening towards the frame then increases. Also, it is relatively easy to produce connections with the wire by means of resistance welding, precisely because the resistance between the frame and a narrow side is greater.

Particular embodiments comprise a core in the inner filter volume which is concentric with said outer wall and thus also the filter component. This core serves to prevent there still being too much milk present in the filter at the start of cleaning, which milk would be lost, and the filter volume available for the cleaning liquid being too large, which would result in the velocity of the cleaning liquid becoming too low. In particular, this core ensures that the duct which is available in net terms for the cleaning liquid becomes thinner, in order thus to reduce the water consumption during cleaning. Advantageously, the core extends along the entire plurality of filter openings, so that the flow velocity of the cleaning liquid is increased along all these filter openings.

In particular, the radial distance between an outer periphery of the core and an inner surface of the filter component is at most 5 mm, such as between 2 and 3 mm. Besides, in particular the radial distance between an outer periphery of the filter component and an inner periphery of the outer wall is at most 5 mm, such as between 2 and 3 mm. This provides attractive flow velocities and associated turbulence intensity in the filter volume. Obviously, other dimensions and distances are not excluded, such as in case milk of much greater milking devices has to be filtered, consequently requiring a much larger filter surface. More particularly, the two said distances are substantially equal, that is to say within 15%. Thus, the filter component will be virtually in the center of the duct formed between the core and the outer wall where generally advantageous flow velocities and turbulence intensity can be achieved.

Figure 2:
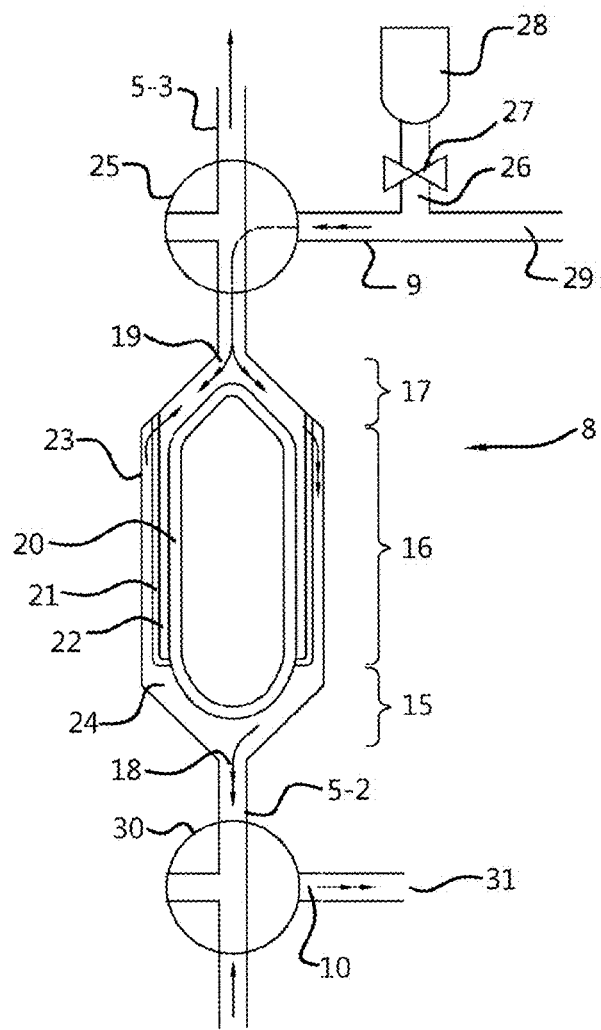
Figure 3A:
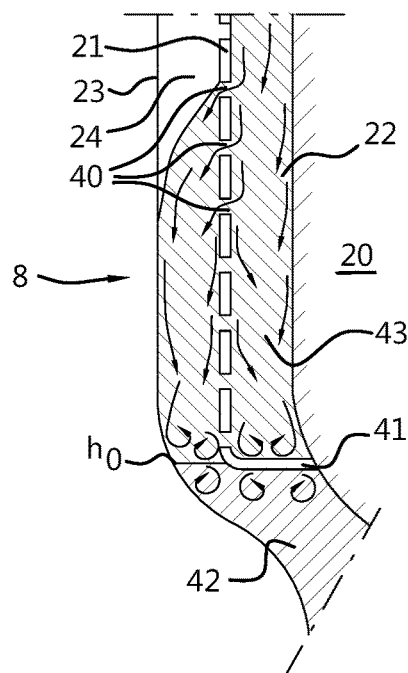
Figure 3B:
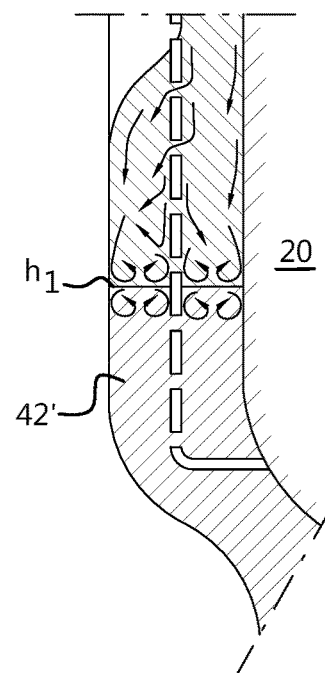
Figure 4A:
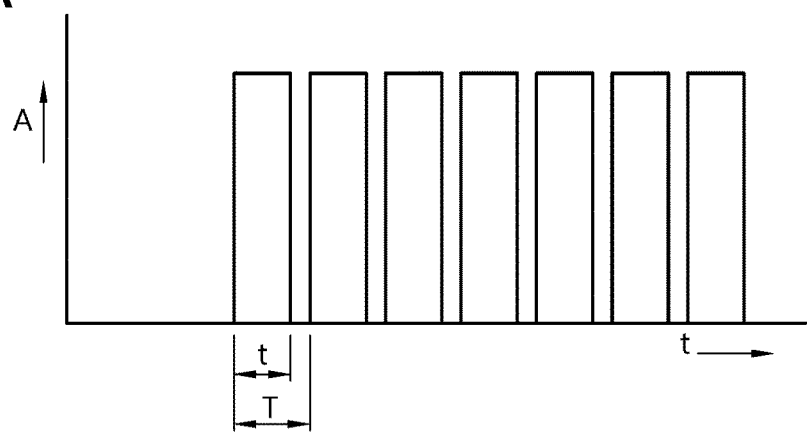
Figure 4B:
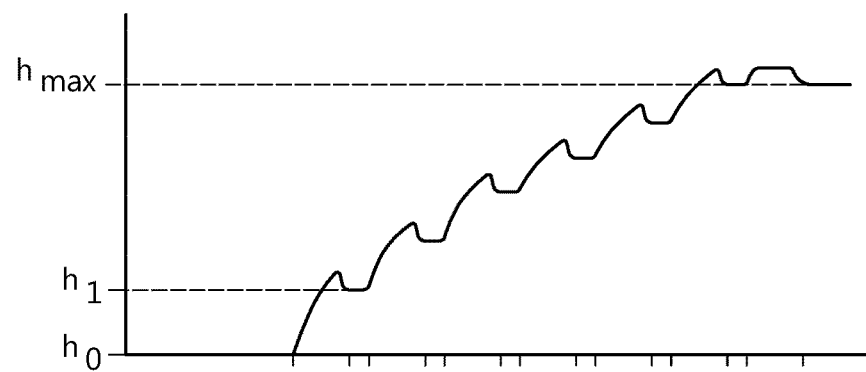

The invention will be explained in more detail below on the basis of some non-limiting exemplary embodiments and the drawing, as well as the description thereof, and in which:

FIG. 1 shows a diagrammatic view of a milking device according to the invention, FIG. 2 shows a diagrammatic sectional view of the milk filter 8 with various connections, FIG. 3a shows a diagrammatic sectional view of a bottom part of the milk filter at a first pulse, and FIG. 3b shows a diagrammatic sectional view of a bottom part of the milk filter at a second pulse, and FIG. 4a gives an example of a cleaning liquid stream as a function of time, and FIG. 4b shows an associated level in the milk filter.

Figure 5:
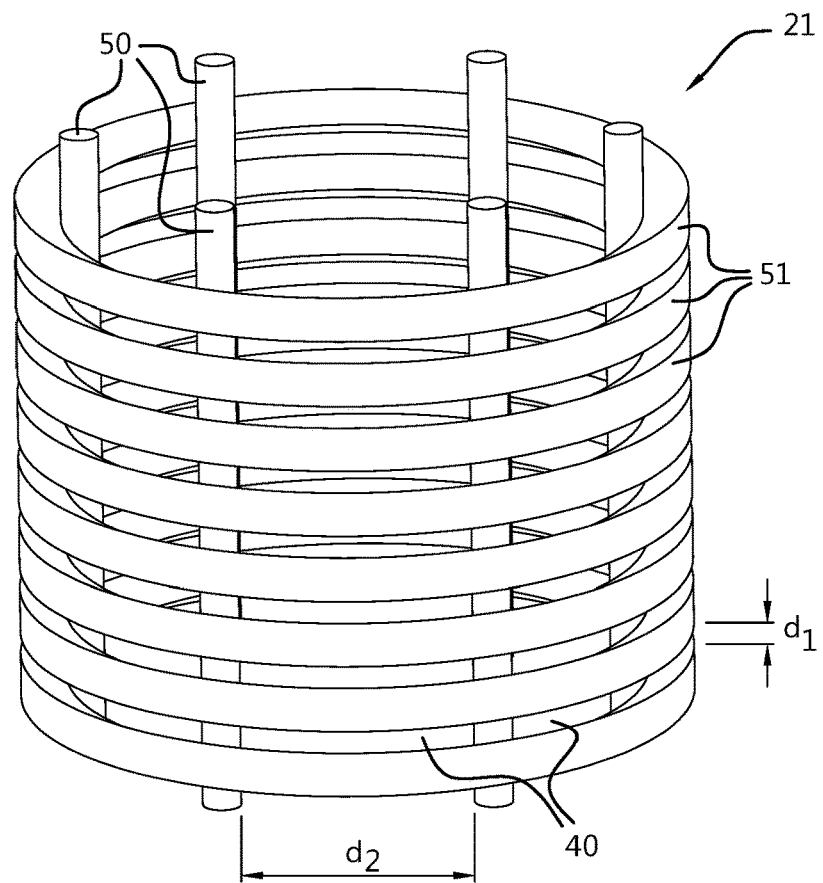

FIG. 5 diagrammatically shows a perspective view of a filter component, and

Figure 6:
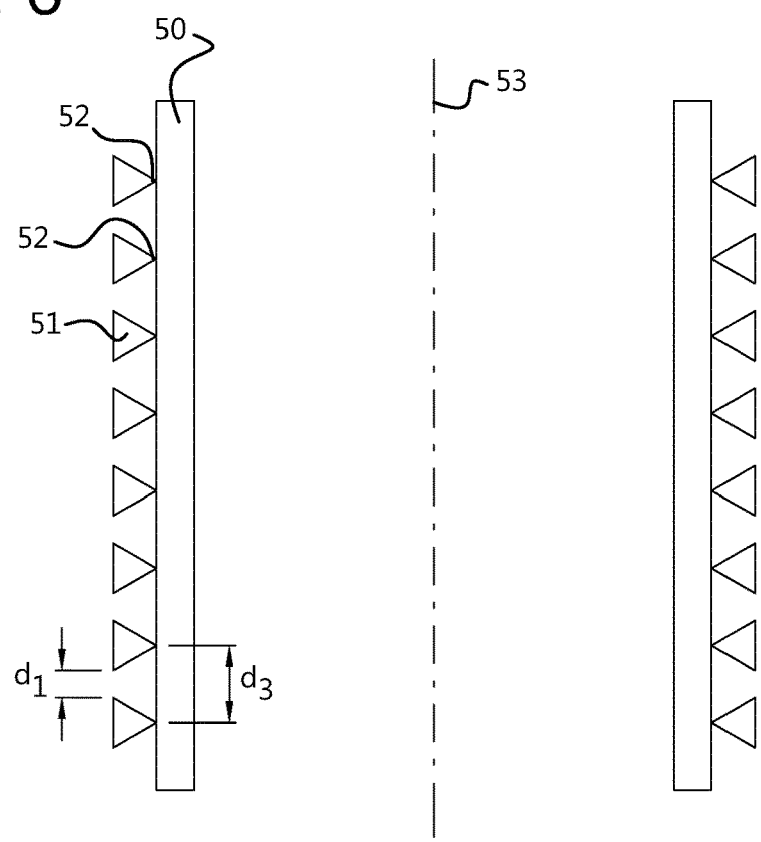

FIG. 6 shows a diagrammatic sectional view of the filter component from FIG. 5.

FIG. 1 shows a diagrammatic view of a milking device 1 according to the invention, comprising a milking cup 2, a milking glass 3, a vacuum pump 4, a milk line 5-1, 5-2, 5-3, a milk pump 6, a milk tank 7, and a milk filter which is denoted overall by reference numeral 8, with a diagrammatic cleaning liquid connection 9 connected to a diagrammatic cleaning device 14 and a diagrammatic discharge connection 10. Reference numeral 11 denotes a control unit and reference numeral 12 denotes an optional milking robot with a robot arm 13. Reference numeral 100 furthermore denotes a dairy animal, with teats 101.

Here, the milking device 1 is a fully automatic milking robot system, but the invention can also be applied in conventional milking systems. By means of its robot arm 13, the milking robot 12 of the milking device 1 can attach milking means, here a milking cup 2, to a teat 101 of the dairy animal under the control of the control unit 11. To this end, components which are known per se, such as a teat-detecting system, are provided, which, however, do not relate to the invention and are therefore not illustrated here and will not be explained in any more detail.

By means of the milking cup attached to the teat 101 and using, inter alia, the vacuum pump 4, the milking device is able to extract milk, which ends up in the milking glass 3. From there, the milk can be passed to the milk tank 7 by means of the milk pump 6 via the milk line, comprising parts 5-1, 5-2 and 5-3, together also denoted below by the number "5", in particular at the end of a milking operation. In the case of very large farms, the fixed milk tank 7 may also be replaced by the tank of a tanker.

The milked milk is filtered by means of the milk filter 8 provided in the milk line 5. This filter serves to filter foreign material, such as hairs, sand, bedding material and the like, from the milk. In this case, the milk flows through the milk filter from the bottom to the top in the illustrated example. Inevitably, the milk filter will gradually become more soiled and will therefore have to be cleaned regularly. According to the invention, this takes place at every main cleaning service of the entire milking device, as will be explained in more detail below. Furthermore, a pressure-drop meter or the like may also be provided (not shown here), which measures the pressure drop across the milk filter 8 and which emits a signal to the control unit 11 if the pressure drop exceeds a threshold value in order to subject the milk filter 8 to an interim cleaning service.

Cleaning may be performed, for example, by passing cleaning liquid through the filter in the same direction as the milk, that is to say from the milking cups 2 and via the milk line 5 through the milk filter 8 to the milk tank 7. The hot, acid or alkaline liquids to be used may efficiently dissolve, for example, fat residues, protein residues or calcium residues. Less advantageous is the fact that hairs, sand and the like are pressed further against the filter without being removed or dissolved. However, a counterflow cleaning operation may be performed in order to remedy this, in which cleaning liquid is supplied in the reverse direction, in particular from cleaning liquid supply 9, via the milk filter 8 to cleaning liquid-discharge 10, such as a sewer.

All this is explained in more detail in FIG. 2, which shows a diagrammatic sectional view of the milk filter 8 with various connections. In this case, similar components are denoted by the same reference numerals throughout the drawing.

The milk filter 8 comprises a housing 23 with a first end 15 with a milk supply opening 18, a cylindrical part 16 and a second end 17 with a milk discharge opening 19. A core 20 and a filter component 21 comprising filter openings are accommodated in the filter volume in the housing 23 and divide this into a first volume part, or outer filter volume, 24 and a second volume part, or inner filter volume, 22.

A first three-way valve 25 is connectable to the cleaning liquid-supply 9 from a holder 29 or the like and to a compressed air line 26 which is closable by a valve 27, to a compressed air generator 28. A second three-way valve 30 is connectable to the cleaning liquid discharge 10 to a sewer 31 or the like.

Furthermore, FIG. 2 shows the path of the milk during milking with single arrows, and the path of the cleaning liquid during a countercurrent cleaning operation with double arrows.

The housing 23 may have any desired cylindrical shape, with a first end 15 and a second end 17 which both narrow towards a supply and discharge, respectively. It should be noted that this supply or discharge does not necessarily have to be provided centrally and/or in the longitudinal direction. Thus, it may also be provided tangentially, in the manner of a kind of cyclone. In this case, the housing may have, for example, an entirely or partly transparent cylindrical part 16, so that the filter component 21 may be inspected without having to remove the filter 8. Obviously, non-transparent materials, such as metals, are also possible.

The core 20, in this case a cylindrical core, is provided in order not to make the duct for the milk and the cleaning liquids, which is formed by the first and the second volume part 24 and 22, respectively, unnecessarily large, which would render the flow velocity of, in particular, the cleaning liquid unnecessarily and undesirably low. It should be noted that a large surface area of the filter component 21 is indeed desirable, obviously containing the proportionate number of filter openings, in order to impede the flow of the milk as little as possible.

In this case, the filter component 21 is a cylindrical metal plate containing a large number of filter openings. Although it is not imperative for the plate to be cylindrical, it has advantages if it is, with regard to an even filter action and cleaning, due to symmetry. The filter openings are not illustrated individually. The structure is explained in more detail below. The filter openings are not shown separately, although it is already emphasized here that the openings are in principle elongated, with a width which is relatively much smaller than a length. For most dirt particles, this width is the determining dimension. Due to the tapering of the cross-sectional profile, the smallest width is taken for this width. This (smallest) width is advantageously between 60 and 120 μm, for example on the basis of, in particular, the dimensions of the fat globules in the milk. In order to be able to filter hairs well, the smallest width is advantageously at most approximately 80 μm. The filter openings are tapered, advantageously from the milk supply side to the milk discharge side, in order to further promote loosening dirt during the countercurrent cleaning operation. In one embodiment, the number of filter openings is at least a few thousand.

One possible action of the milk filter is as follows. During milking, milk flows from the milk line part 5-2, via the milk supply opening 18, into the first end 15 of the milk filter 8 from below. In this case, the milk ends up in the first volume part 24 and then flows to the second volume part 22 via the filter openings of the filter component 21, with foreign material remaining behind on the filter component 21. Thereafter, the milk is forced onwards via the second end 17 and will leave the milk filter 8 via milk discharge opening 19, in order to then be pumped to the milk tank (not shown here) via the first three-way valve 25 and the milk line part 5-3.

If a main cleaning service of the milking device is performed after a milking operation, cleaning liquid will be able to follow at least a part of the same path through the milk filter 8. However, it is advantageous to start with a countercurrent cleaning operation in order to already remove at least part of the filtered-out foreign material from the milk filter 8, so that this will not impede the flow of cleaning liquid any further, and to render, in particular, the filter component 21 more easily cleanable. For this countercurrent cleaning operation, for example, cleaning liquid, such as water, may be supplied by switching the first three-way valve 25 in such a way that it connects the cleaning liquid supply 9 and the milk filter 8, and subsequently supply it from a holder 29, which may also be a water pipe. If desired, a compressed air from the compressed air generator 28 may be added, via compressed air line 26, by switching the valve 27. As is known per se, compressed air may contribute to a greater turbulence intensity of the cleaning liquid, and thus to an even better (mechanical) cleaning operation of the milk filter 8. Incidentally, the holder 29 may also be configured to provide pressurized cleaning liquid. For example, the holder 29 comprises an accumulator (not shown), by means of which pressure can be built up which will slowly decrease while the cleaning liquid is being dispensed, in a way similar to an expansion vessel in a central heating installation. A pump may also be provided, or simply the force of gravity, by placing the holder at a desired height.

The cleaning liquid to be supplied in countercurrent enters the milk filter 8 via the milk discharge opening 19 of the second end 17, and will flush the milk filter 8 through the second volume part 22, the filter component 21, the first end 15 and the milk supply opening 18, and carry along foreign material in the process. The cleaning liquid can then run away to the sewer or a collecting receptacle via the milk line part 5-2 and the now switched second three-way valve via the cleaning liquid discharge 10. As a result thereof, the dirty cleaning water does not have to flow through the rest of the milking device.

In this case, it should be noted that, during milking, the milk will fill the filter volume (parts 22 and 24) from below. Any parts floating on the milk will, in theory, then also end up mainly in the upper filter openings of the filter component 21. Furthermore, with a standard construction of the milk filter 8, the cleaning action has been found often to be insufficient in particular for these upper filter openings. The solution according to the invention will be explained below on the basis of FIG. 3 and further.

FIG. 3a shows a diagrammatic sectional view of a bottom part of the milk filter at a first pulse, and FIG. 3b shows a diagrammatic sectional view of a bottom part of the milk filter at a second pulse.

FIG. 3a shows a bottom part of the milk filter 8, comprising the outer wall 23, the filter component 21 with filter openings 40 and a bottom wall 41 and the core 20, as well as the first volume part 24 and the second volume part 22. The bottom part contains cleaning liquid 42 up to a level ho. Furthermore, the incoming stream of cleaning liquid plus compressed air 43 in the first pulse is shown diagrammatically. Arrows indicate the directions of flow therein.

The new, fresh cleaning liquid, together with the compressed air 43 enters from above, initially via the inner filter volume or second volume part 22. This fresh cleaning liquid also passes virtually immediately through the filter openings 40 to the outer filter volume or first volume part 24. At the bottom, the stream of the cleaning liquid comprising compressed air 23 hits the bottom wall 41 of the filter component 21 as well as the previously collected amount of cleaning liquid 42, which is indicated by an opposite hatching and has reached a level ho. As a result of the fresh cleaning liquid 43 colliding with the collected cleaning liquid 42 and/or the inner wall 41 at that location, that is to say at that level ho, a great turbulence occurs, even with a local countercurrent, both in the fresh cleaning liquid 43 and in the upper layer of the previously collected cleaning liquid 42. This is shown diagrammatically by the swirling arrows. Due to these turbulences, the cleaning liquid will have a greater cleaning action on the filter component 21 with the filter openings 40 at that location. This is probably the reason why, with the milk filter known from the prior art, the bottom part is usually cleaned thoroughly. It should be noted that there are already turbulences present in and around the filter without the collision with the liquid level. These have not been illustrated for the sake of clarity.

FIG. 3b shows a diagrammatic sectional view of a bottom part of the milk filter at a second pulse. In this case, it should be noted that, at the end of the previous pulse (for the sake of convenience here referred to as the first pulse) a certain amount of cleaning liquid 42' has collected in the milk filter 8, up to a level hi. This cleaning liquid could be collected because, in net terms, less liquid was able to flow away than has entered. In this case, it is possible, for example, to close off the valve 30 from FIG. 2 entirely or partly during the first pulse. It is also possible to make the stream of cleaning liquid greater than the discharge capacity, so that the level in the milk filter will rise during the first pulse in both cases.

If a second pulse of cleaning liquid is then provided, as is the case here in FIG. 3b, this will not collide with the bottom wall 41 of the filter component 21, but hit the previously collected cleaning liquid 42, at the location of the level h. This means that the turbulences will now take place around this level h, and subsequently, with later pulses, at a correspondingly higher level. This means, in turn, that the filter openings at the location of the level h, and subsequently at a correspondingly higher level, will be thoroughly cleaned.

It will be clear that subsequent pulses can result in good cleaning of the filter component 21 at an in each case higher level. It is also possible to clean the higher parts of the filter component 21 more thoroughly by producing more pulses which start at a higher level, at these higher parts.

To this end, as has already been mentioned briefly above, the three-way valve 30 or any other valve in the discharge of cleaning liquid, or the supply of cleaning liquid or a combination thereof is controlled in such a way by the control unit that the desired level in the milk filter is reached at the end of draining, between two pulses. Thus, the passage of a possible valve in the discharge, the flow rate of the cleaning liquid and the pulse time and draining time are available as variables, among others.

FIG. 4a gives an example of a stream of cleaning liquid as a function of time. FIG. 4b gives an associated level h in the milk filter.

In this example, seven equal pulses of cleaning liquid are provided, with a time duration t and a repetition rate T, i.e. a frequency of 1/T. Empirical values are, for example, t=0.5 s, and T=0.75 s, although variations are of course possible. Actually, it has been found to be advantageous to keep, in particular, the draining time, i.e. the time duration between the pulses, short, such as 0.25 seconds in this case. This applies in particular in order to produce peaks in the wall sheer stress, and also, if compressed air injection takes place, because the injected air does not have the time to form large air bubbles in this short time and in which case the effect of the non-compressibility of the cleaning liquid would be lost.

In this case, the number of pulses is 7, but any desired number greater or equal to 2 is possible in principle. Here, the pulses are all equal, although this is not obligatory and it would for example also be possible to increase the pulse duration t or to increase the flow rate during the pulse in order to raise the level in the milk filter at the end of the draining time or, if desired, lower it, at least take it to a desired level. Furthermore, it is not obligatory for the level h of the cleaning liquid in the milk filter to increase from pulse to pulse at the end of the draining time. It is also possible, as is the case in the illustrated example, to increase the level h in each case after the first x pulses up to the maximum level $h_{max}$, that is to say the level which is reached after draining in the draining time has taken place, when the milk filter is filled to the maximum degree during the preceding pulse, and subsequently in each case completely fill the milk filter during the remaining pulses and allow it to drop to the maximum $h_{max}$. In this way, the upper part of the milk filter can be cleaned very thoroughly.

FIG. 5 shows a diagrammatic perspective view of a filter element 21. It comprises a frame of support wires 50, with rings 51 therearound, and the filter openings 40 therebetween. FIG. 6 shows a diagrammatic sectional view through the filter element of FIG. 5, through a plane extending through the leftmost support wire, and the rightmost support wire 50. Reference numerals 52 indicate connection points, and 53 the longitudinal direction of the filter member 21.

The filter member 21 shown here consists of eight rings 51 around a frame of six strut wires 50 for simplicity, and thus forty-two openings 40 are provided. In practice, in view of the often desired dimensions of the filter openings 40, many more such openings will be provided, and correspondingly more support wires 50 and/or rings 51. Furthermore, for the manufacturability of the filter component 21, it is often easier not to have separate rings 51, but one long wire wound around the support wires 50 in coils. Finally, it is also possible to reverse the function of the support wires 50 and the rings 51. In this case, this means that precisely the vertical elements or rods 50 will have a tapered cross-sectional profile, and will be held together by the rings 51. Of course, the relationships between the vertical elements and the horizontal elements will be reversed, i.e. there will be relatively more vertical elements. 50 then horizontal elements 51 will be. This will make no difference for the further explanation.

In the example, the widest side of the wire/windings 51 is located on the outside of the filter element 21. This is suitable for allowing milk to flow from the outside in through the filter element 21, so that cleaning liquid flowing in counterflow direction, i.e. from the inside to the outside, will be able to effectively loosen and entrain the filtered dirt. In order to disturb the flow of milk and the cleaning liquid, respectively, as little as possible, the support wires 50 are located on the inside of the wire/windings 51. However, it is also possible to fix support wires 50 on the outside. Furthermore, it is possible to arrange the wire/windings with the thinnest side outwards, in particular if the milk has to flow from the inside to the outside through the filter element.

The filter openings 40 have a width d1 and a length d2. In practice, the width d1 will be relatively smaller than the width d2, for instance one or more orders of magnitude. For milk filters, a suitable width is, for example, between 50 and 90 μm, such as 60-80 μm. The length can be, for example, 5 or 10 mm, or even more. Since with such lengths hairs of dairy animals could slip through parallel to the opening 40, it is important to choose the width d1 not much greater than the thickness of a hair. A bovine hair has a thickness of about 60 μm, but will almost never be completely straight. A width d1 should then preferably not be much more than 60 μm, such as for instance between 60 and 80 μm.

The section shown in FIG. 6 shows the tapered cross-sectional profile of the wire, i.e. the rings 51. Here, the profile is triangular, with the largest side on the outside, and the thinnest side on the inside of the filter element 21. At that thinnest side, the rings having a point of attachment 52 attached to the support wires 50, such as with a resistance weld like a spot weld. It is noted that the cross-sectional profile can also be less tapered or sharp, and for instance rounded, semi-elliptical, semicircular, or even frustoconical. There is then still the advantage of filter openings that widen in the milk flow direction, but there are other options for attaching the wire to the frame.

On the flat outer side, the width of the opening is d1, while towards the thin side it increases to d3. Where d1 is determined by the wishes with regard to material to be filtered out, the width d3 is not limited by that. Rather, it is determined by the width of the rings 51, and the degree of taper of the cross-sectional profile. It may be advantageous to take a relatively gradually tapered profile, i.e. a fairly flat wire, so that d3 is not very much smaller than d1. For example, d3 is between 120 and 160 μm.

The illustrated exemplary embodiments are by no means intended to be limiting. Rather, the scope of protection of the invention is determined by the attached claims.

The invention claimed is:

1. A milking device for milking a dairy animal, comprising:
   milking means,
   a control unit for the milking device,
   a milk line for transporting milk from the milking means to a milk tank,
   a milk filter for filtering the milk passing through the milk line, and
   a cleaning device for cleaning the milk filter with cleaning liquid,
   wherein the milk filter further comprises:
      a housing which surrounds a filter volume, and which housing further comprises a milk supply opening part with a milk supply opening, a milk discharge opening part with a milk discharge opening, and a circumferential outer wall in between, and
      a tube-shaped filter component with a longitudinal dimension which is provided in the filter volume and which divides the filter volume into a central inner filter volume which is connected to the milk discharge opening, and an outer filter volume surrounding the central inner filter volume, and connected to the milk supply opening,
   wherein the filter component further comprises wire with a unilaterally tapering cross-sectional profile and a frame, which wire is provided in a spiral shape with a plurality of windings or in a series of individual parallel rings, wherein the frame is configured to keep the windings or the rings at a mutual distance, as a result of which a plurality of filter openings is provided between the windings or the rings,
   wherein the milk filter is configured to be flushed, in use, in a first direction with the milk to be filtered, which first direction runs from the milk supply opening to the milk discharge opening,
   wherein the cleaning device is configured to clean the milk filter by passing cleaning liquid through the milk filter in a countercurrent direction opposite to the first direction in at least two consecutive pulses, in such a way that in every pulse:
      during a first pulse stage, more cleaning liquid is supplied than is discharged, and
      subsequently, during a second pulse stage, at least as much cleaning liquid flows from the filter volume as is supplied, so that an amount of cleaning liquid collects in the filter volume up to a liquid level which surrounds at least a portion of the plurality of filter openings, and
   wherein the cleaning device is configured so cleaning liquid from a subsequent pulse collides with liquid at a liquid level from a preceding pulse in the filter.

2. The milking device as claimed in claim 1, wherein the liquid level is situated in an upper half of the plurality of filter openings.

3. The milking device as claimed in claim 1, wherein the cleaning device is configured to change the liquid level from pulse to pulse.

4. The milking device as claimed claim 1, wherein a frequency of the pulses is higher than 0.5 Hz.

5. The milking device as claimed in claim 1, wherein the second pulse stage is shorter than 1 second.

6. The milking device as claimed in claim 1, wherein a number of pulses is between 2 and 20.

7. The milking device as claimed in claim 1, comprising a pressure device which is configured to provide pressurized cleaning liquid to the milk filter.

8. The milking device as claimed in claim 1, comprising a compressed air supply for supplying compressed air to the cleaning liquid before the latter enters the filter volume.

9. The milking device as claimed in claim 1, comprising an inlet valve device which is controllable by the control unit for controlling a supply of cleaning liquid, and/or an outlet valve device which is controllable by the control unit for controlling a discharge of the cleaning liquid.

10. The milking device as claimed in claim 1, wherein the inner filter volume is connected to the milk discharge opening.

11. The milking device as claimed in claim 1, wherein the housing is substantially cylindrical and wherein said filter component is concentric with the outer wall.

12. The milking device as claimed in claim 1, comprising a core at least partially located in the inner filter volume which is concentric with said outer wall.

13. The milking device as claimed in claim 1, wherein the frame comprises a plurality of mutually parallel support wires, which are attached to the wire at attachment points and wherein the support wires extend substantially perpendicular to the wire at the location of the attachment points.

14. The milking device as claimed in claim 1, wherein the cleaning device is configured to raise the liquid level from pulse to pulse.

15. The milking device as claimed in claim 1, wherein the second pulse stage is at most 0.5 seconds.

16. The milking device as claimed in claim 1, wherein the outer wall is transparent.

17. The milking device as claimed in claim 12, wherein the core extends along the entire plurality of filter openings.

18. The milking device as claimed in claim 13, wherein the plurality of mutually parallel support wires are attached to the wire at attachment points by a welding connection.

* * * * *